Jan. 22, 1963 L. M. CARPENTER 3,074,301
WIRE STRIPPER

Filed Nov. 9, 1959 3 Sheets-Sheet 1

*INVENTOR.*
LOUIS. M. CARPENTER.
BY
ATTORNEY

Jan. 22, 1963 L. M. CARPENTER 3,074,301
WIRE STRIPPER

Filed Nov. 9, 1959 3 Sheets-Sheet 2

INVENTOR.
LOUIS M. CARPENTER.
BY
ATTORNEY

Jan. 22, 1963 L. M. CARPENTER 3,074,301
WIRE STRIPPER
Filed Nov. 9, 1959 3 Sheets-Sheet 3
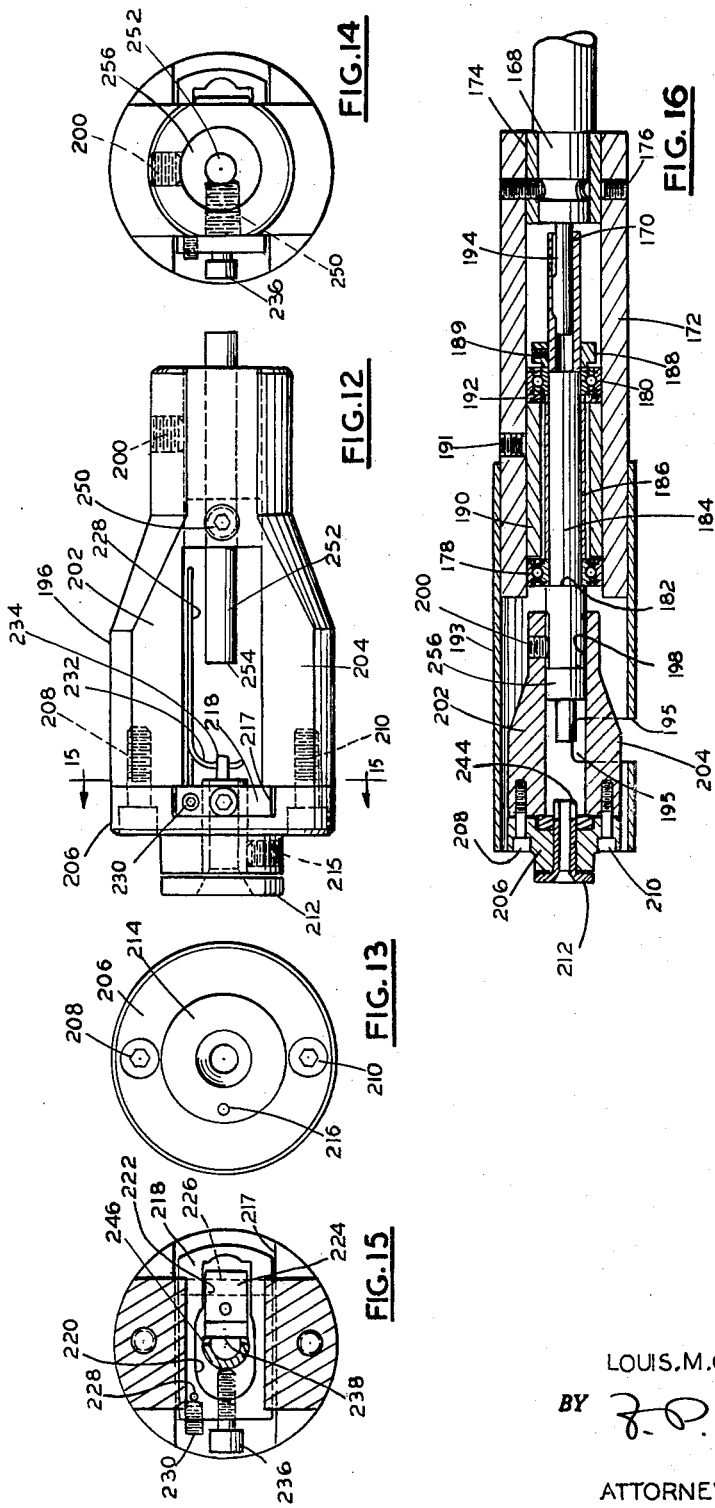
INVENTOR.
LOUIS.M.CARPENTER.
BY
ATTORNEY United States Patent Office 3,074,301
Patented Jan. 22, 1963

3,074,301
WIRE STRIPPER
Louis M. Carpenter, Lyndon Corners, High Bridge Road,
Fayetteville, N.Y.
Filed Nov. 9, 1959, Ser. No. 851,723
14 Claims. (Cl. 81—9.51)

This invention relates to apparatus for the removal of insulation from electrical conductors preparatory to establishing electrical connections between wires, and wire terminals.

The insulation upon electrical conductors are of many different types and since they are designed to permanently protect the wire, they are applied in such a manner as to make removal difficult. Insulations of the enamel, varnish, nylon or Teflon type, which are applied as a thin film, have required abrasives such as fiber glass, or solvents to remove the insulation for making electrical connections. Other types of insulation include rubber covered, plastic walled, served or braided coverings and combinations applied to either single or multi-stranded conductors. In every case the insulation presents a problem, in the removal thereof, as is necessary when electrical connections are to be made. Stripping, when done with common pocket knives and the like, is tedious and injury to the conductor may occur. In a stranded wire, such stripping may eliminate the twist so that the wire end is splayed requiring retwisting.

The present invention is directed to a power operated rotary stripper operating on the end of a wire to strip the end over a fixed length. The apparatus is adapted to receive the end of a wire to be stripped, and by the insertion and subsequent withdrawal of the wire end from the apparatus, stripping is automatically accomplished. The stripping is accurate, practically instantaneous, and avoids damage to the conductor. In the portable form, where a flexible drive shaft is employed, the stripper may be conveniently brought to the location of the insulated wire end required to be stripped.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 12 is a side elevational view of the stripper head adapted for use with a flexible drive shaft;

FIGURE 13 is an end elevational view of the stripper of FIGURE 12;

FIGURE 14 is a rear elevational view of the stripper head of FIGURE 12;

FIGURE 15 is a transverse sectional view taken on the line 15—15 of FIGURE 12; and FIGURE 16 is a longitudinal sectional view through the stripper head, and flexible shafting coupling assembly.

Figure 1:
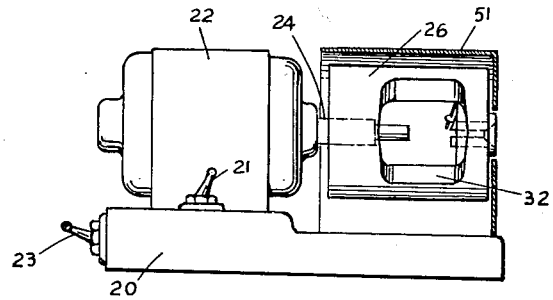
FIGURE 1 is a side elevational view of a wire stripper for bench use with the housing in section.

Referring to the drawings and particularly FIGURES 1–9 thereof, the stripper comprises a base 20 on which is mounted a small motor 22 having a drive shaft 24 rotating at a speed of about 1800 r.p.m. A motor switch 21, and a reversing switch 23 are provided. Mounted on the shaft is the stripper head 26. The stripper head is provided with a hub end 28 adapted to be mounted on the motor shaft, and secured thereto by a set screw 30. The head is of generally cylindrical outline having opposing side windows 32, and is adapted to receive in its opposite end a stripper face plate 34, the same being seated in an annular groove 36, and secured in place by radial screws 38. The face plate has a central aperture 40 in which is positioned a guide sleeve 42, that is held in place by a set screw 44, the guide sleeve being keyed as by a pin 46 projecting from the face plate and adapted to have its end project into an aperture 48 in the flange 50 of the guide sleeve. A housing 51, which may be open at the rear, is mounted on the base.

On the rear side of the face plate are mounted a blade block 52 and a stop block 54. The stop block is affixed to the plate as by screws 56, while the blade block is pivotally mounted on the plate on a screw 58. The blade block is provided with a keyhole shaped aperture 60, the slot portion 62 of which extends substantially radially from the axis of the head. A milled groove 64 extends across the slot, and a pivot pin 66 is seated in said groove and extends across the slot, and the ends of the pin 66 are secured in the groove beneath the heads of the screws 68.

Upon the pin 66 is pivotally mounted a blade 70, disposed in the slot. A U spring 72 mounted beneath the screw 74 has its free end bearing upon the arm 76 of the blade 70, and urges it to the position shown in FIGURES 6 and 9, wherein the blade end rests against the riser end 79 of the cut-away step 78 of the guide sleeve 42. The blade may be of the shape illustrated with a cutting edge 80, the tip end of the blade being provided with a carbide tip 82.

Figure 6:
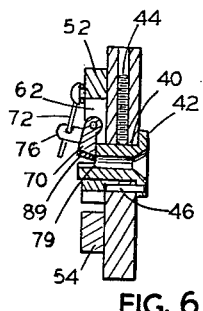
FIGURE 6 is a sectional view taken on the line 6—6 of FIGURE 5.

As shown in FIGURE 6, the spring 72 urges the cutting blade against the step or cut-away end 79 of the guide sleeve. In practice the bore 84 of the guide sleeve will approximate the diameter of the insulated wire that is to be stripped, and the cutting edge of the blade will be set radially inward of the bore toward the axis, by an amount just short of being equal to the thickness of the insulation.

Figure 8:
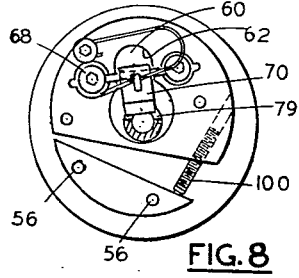
FIGURE 8 is a view similar to FIGURE 5, showing the adjustment for various wire sizes.

A suitable stop pin 86 is slidably disposed in a central bore in the motor shaft, and is secured in any desired position by a set screw 88 which is threaded in the head hub portion, and extends through a radial aperture in the motor shaft. The location of the butt end 90 will determine the length of the wire to be stripped. The stop 86 is set to provide stripping of any desired length. To accurately locate the cutting edge, the blade block is pivotally mounted on the screw 58, and provided with an adjusting set screw 100. The block is also provided with a clamp screw 102, extending through a slot 104 in the face plate 34, so that when the blade block is adjusted to provide the proper cutting depth, the screw 102 is tightened, to securely hold the blade block rigid in its set position. In FIGURE 8, the blade block is shown adjusted to a position to accommodate a large diameter wire with medium thick insulation, and a guide sleeve with a large bore, to accommodate such insulated wire as shown.

A variety of quickly interchangeable stripping blades or jaws have been developed to adapt the device to the widest possible gauge range of single conductor or stranded wires and coaxial cable having single and complex constructions of insulation of varying wall thicknesses and with different surface and structural characteristics.

Figure 9:
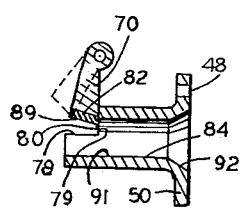
FIGURE 9 is a longitudinal sectional view through the blade and cooperating guide sleeve.
Figure 10:
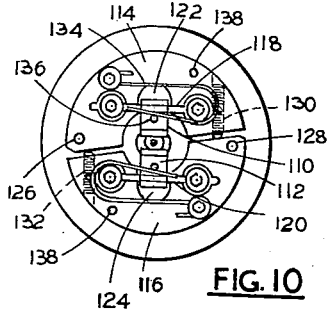
FIGURE 10 is an elevational view of a modified stripper face plate, wherein two blades are employed.

All blades are top-hinged, pawl type with the same pivotal dimensions as shown in FIGURES 9 and 10. However, the opposite ends or blade tips vary widely in cross-sectional shape with a resulting difference in reaction on the countless and ever changing types of wire and insulation constructions.

Most easily described and most apparent in reaction is the tool steel knife with a thin blade and a keen cutting edge. This blade is generally used for common, "easy to strip," thick walled insulations such as "rubber" and PVC extruded over a single stiff solid conductor such as used for house wiring. With this, the end to be stripped is held manually against rotation, inserted into the flared end of the bore 92 and through the guide sleeve 42 until it engages stop 90. In so doing, the knife rotating with the face plate will swing open away from the bushing step 79 against the resistance of the spring 72 with the cutting edge riding around the outside surface of the insulation. The blade is angularly so disposed in relation to the wire that upon the start of withdrawal, the blade starts to cut into the surface of the insulation and continues to cut deeper with continued withdrawal until the blade reaches the bushing step 79 where it is stopped, having reached its deepest cut just short of the conductor. At this point, the back or clearance face of the blade forms a partial wall or barrier through and across the insulation almost perpendicular to the wire so that continued withdrawal of the wire against this barrier breaks the remaining web of insulation directly over the conductor and permits the conductor to be pulled out of the tube-like slug of insulation which remains back of this blade barrier in the machine until it is displaced by another inserted wire. This type of wire can be stripped as fast as an operator can feed the wire ends in and out of the stripper.

A consistent precise depth of cut without care or readjustment is prompted by the simplicity of the blade mechanism. The increased ease and speed of operation resulting from the mere insertion and withdrawal of the wire obviates the need to coordinate auxiliary movements required to operate external hand levers or foot pedals, etc.

Certain newer types of insulation cannot be stripped satisfactorily with so called sharp blades. Most notable among these is thin-walled, wrapped and extruded Teflon which has recently come into wide demand for high temperature applications. It is widely used not only for primary insulation over a conductor but also as outer jackets over coaxial cable and other complex constructions.

The peculiar progressive action of the "square" edged swinging blade 70 FIGURE 9 operating in conjunction with the semi-cylindrical trough in the projecting bushing step 91 is quite complex and not immediately apparent. It can be likened somewhat to the action of a camsegment pawl operating in a cam-type friction ratchet where with the proper location of the pivot in relation to the throw and climb of the cam is important. A square stripping blade improperly disposed in angular relation to the wire will, when open, simply skid over the slippery surface of the wire and will not take hold and start the close. Also, in the closed position, unless it has reached dead center in relation to the pivot, it may climb back out the slippery groove it forms and not complete the strip.

The full cycle of effective stripping action appears to be as follows:

When a wire is inserted, the square blade swings open as shown by the dotted lines in FIGURE 9. In this open position, the leading square edge presents a relatively sharp cutting edge to the insulation. As the wire withdrawal cycle starts, this sharp edge cuts into and scores the insulation, forming a tooth which assists the spring and the frictional cam action in drawing the blade along with the wire toward closed. As the blade continues on its arc, the cutting angle recedes and likewise the cutting action decreases. It progressively converts itself into a self-shearing action in the grain structure of the insulation caused by the increasing arcially imposed pressure between the bottom of the blade and the trough in the bushing. At the same time, the blade bottom tends to squeegee the insulation backward and outward under the decreasing pitch.

When the blade reaches the completely closed position against the step FIGURE 9, it is locked on dead center or just slightly beyond so it cannot climb back out of its slippery groove. Thus, at its deepest point of penetration, it is locked just short of the conductor with the bottom clearance face 89 almost parallel to the conductor and effectively separated from it by a remaining web of untouched insulation and a cushion of compressed insulation firmly wedged under the blade and behind the cut.

It should be noted that if the blade could contact the conductor, that contact would impart only a surface burnishing effect rather than a sharp cut into the grain structure of the metal at its most vulnerable point, mechanically and electrically.

Continued withdrawal of the wire against the canted rotating bottom of the blade increasingly creates a running restricted orifice effect, the frictional pressure of which tends to soften the plastic and free its grip around the wire while applying a torque against the withdrawal pull that fractures the final web of insulation and permits the conductor to be completely pulled out, leaving behind it the stripped sleeve of insulation.

A properly performing blade leaves a stripped wire end with a square faced shoulder of insulation at the strip point and a stranded conductor properly twisted to facilitate further handling.

Figure 11:
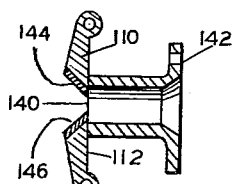
FIGURE 11 is a longitudinal sectional view through the double blade and guide sleeve of the form shown in FIGURE 10.

With pawl type blades, the thin sharp blade and the square block blade represent extremes in clearance angles to meet certain specific stripping conditions as explained. Intermediate angles such as shown at FIGURE 11 and other blade end configurations have been developed to meet other conditions. All retain certain basic dimensional and positional relationships such as the position of the pivot point, the throw of the blade, the closed point of the blade swing, the amount of back pressure on the blade, etc., in order that a relatively wide range of wire gauges and strandings together with a wide range of insulation constructions can be successfully stripped.

Figure 7:
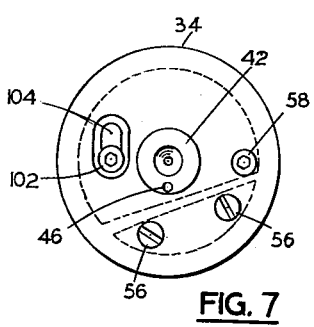
FIGURE 7 is a front elevational view of the face plate assembly.

In the form shown in FIGURES 10 and 11, two knife blades 110 and 112 are employed, each being mounted in identical segmental blade blocks 114 and 116 on pivot pins 118 and 120, extending across recesses 122 and 124. Each block is pivoted as at 126 and 128, and each block has an adjusting set screw 130 and 132. Each block is provided with a spring 134 acting against an arm 136 on the pivoted blade, and each blade block may be clamped to the face plate by a screw 138, a slot in the face plate being provided, in the same manner as shown in FIGURE 7, at 104.

As shown in FIGURE 11, the knives will swing against the end 140 of the guide sleeve 142 during withdrawal of a wire end and the knives will cut to almost the depth of the insulation, and the inclined clearance surfaces 144 and 146 will work the severed insulation loose on the wire, causing the severed insulation to promptly free itself of the wire.

Figure 2:
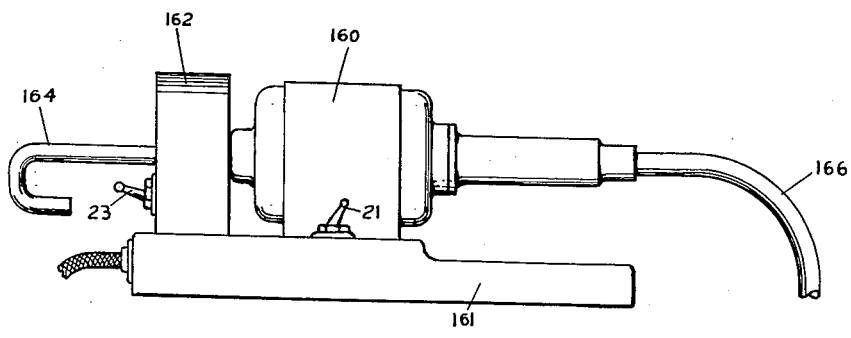
FIGURE 2 is a side elevational view of a portable wire stripper employing a flexible drive shaft.
Figure 2:
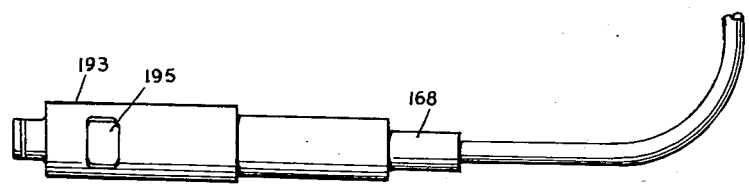
Figure 3:
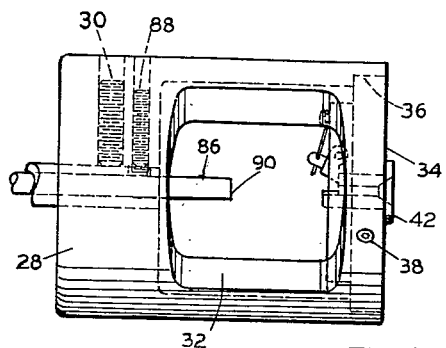
FIGURE 3 is a side elevational view of the stripper of the form shown in FIGURE 1.
Figure 4:
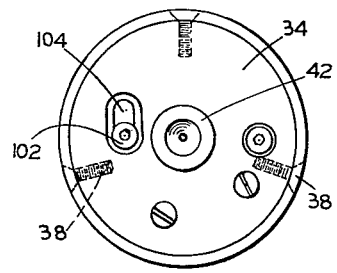
FIGURE 4 is an end elevational view of the head of FIGURE 3.
Figure 5:
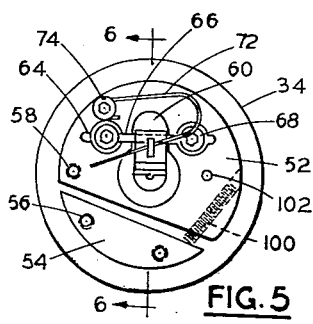
FIGURE 5 is an elevational view of the stripper face plate assembly from the rear thereof.

The head shown in FIGURES 2 and 12–16 inclusive is similar to that in FIGURE 3, but is of reduced overall diameter to adapt it for use on the end of a flexible drive shaft and to permit it to be used where space is limited. In FIGURE 2 the motor 160 is mounted on a base 161, and a control box 162 is located behind the motor. A hook 164 is provided so that the motor can be hung at a convenient location. The flexible drive shaft 166, as is understood in the art, comprises a flexible housing, within which is a flexible shaft. The housing terminates in a sleeve 168, from which projects the splined drive shaft end 170. A bearing sleeve 172 having an end bushing 174 and set screws 176 is adapted to be affixed to the sleeve 168.

Within the sleeve 172 are spaced ball bearings 178 and 180, the internal races of which are locked between a shoulder 182 on the spindle 184, a spacer sleeve 186 and a collar 188 held by a set screw 189. The external races are yieldingly spread apart by an intervening sleeve 190 and a sinusoidal spring washer 192, to secure accurate centering and eliminate play. The sleeve 190 may be fixed within the sleeve 172 by a set screw 191. The spindle is hollow and at its driven end provided with a key-way 194 to receive the splined drive shaft end 170. A housing sleeve 193 is slid over the sleeve 172, and held frictionally, the sleece being long enough to form a guard around the stripper head assembly. The sleeve 193 has an aperture 195 to allow strippings to drop out.

Affixed to the other end of the spindle 184 is the stripper head assembly 196. At one end of the head is a hub bore 198 adapted to be affixed upon the hollow spindle 184 as by a set screw 200. The head has two spaced arms 202 and 204, to the end of which is secured the cutter carrying face plate 206, as by screws 208 and 210. The face plate has a central aperture to receive a guide bushing 212, the flange 214 of which is pinned for rotation with the face plate as at 216. The bushing is held in place by a set screw 215.

On the back side of the face plate is a transverse groove 217 in which is slidably disposed a blade block 218, having a key-hole aperture 220 large enough to clear the inner end of the bushing 212, and having a slot portion 222 in which is pivotally mounted a hinged cutter 224, mounted on a pivot pin 226. A hairpin spring 228, having one end embedded in the blade block and held by a set screw as at 230, has its free end bent laterally as at 232 to bear against an arm 234 mounted on the cutter blades. The blade block is laterally adjustable by a set screw 236, bearing on the under side of the guide sleeve, to position the cutting edge 238 of the blade to the proper depth corresponding to the insulation thickness of the insulated wire to be stripped. The blade is essentially like that shown in FIGURES 6 and 9.

The thickness of the blade block 218 is somewhat greater than the depth of the groove 217, so that by drawing the face plate 206 against the ends of the arms 202 and 204, as by screws 208 and 210, the blade block is locked in any set position. The guide bushing 212 has its inner end cut away as at 244 to provide a step, and a shoulder 246 against which the blade is yieldingly urged into abutment by the spring 228. As in the form shown in FIGURES 1 and 3–9, the blade and the guide sleeve coact in the stripping operation in like manner.

A stop to limit the length of wire end to be stripped is affixed in the hub end of the head by a set screw 250, the stop comprising a stop rod 252, having an end abutment 254. The pin is disposed in a collar 256 located ahead of the hollow drive spindle 184. The stop pin may be set in different positions and held by the set screw 250, which is threaded in the head 196, and extends through a radial aperture in the collar 256.

The clearance surface 89, behind the cutting edge of the blade may bear an angular relation to the face of the blade as great as 75°, so that the clearance surface rides upon and jams the insulation toward the conductor immediately behind the cut, and in rotating around the wire provides a running constricting orifice effect. The friction transmitted from the clearance surface to the insulation, of the conductor supported by guide sleeve step portion, produces a crowding effect of the insulation on the side approaching the clearance surface, that applies a torque to the insulation, and also tends to lift or break the insulation away from its grip upon the conductor. The blade of the type illustrated in FIGURE 9 is especially effective on thin wall insulation such as Teflon for the foregoing reasons.

The angle between the clearance surface on the blade face may be reduced to provide a sharper cutting edge where the insulation is thicker and in cases where the insulation includes braided fabric such as cotton or fiberglass. For some insulations of medium thickness, the use of two blades as shown in FIGURES 10 and 11 have an advantage in that better end thrust against the insulation severed is obtained, as the wire is withdrawn during the stripping operation.

The rotation direction of the stripping head, when used on stranded inductors will be in the direction of the lay or twist, and to accommodate left hand or right hand twists, the motor is of the reversible type.

Although several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A rotary wire stripper comprising a stripper face plate having an insulated wire receiving coaxial cylindrical aperture therein, said aperture terminating at least in part on a transverse plane on one side of said plate, a cutting blade pivotally mounted on the plate on an axis lying substantially on said plane and laterally displaced from the aperture axis, said blade having a cutting edge adapted to swing from a first position in said plane and projecting partially across said aperture, to a second position radially disposed from the axis by an amount equal to the radius of the aperture and displaced rearwardly from said plane, said edge being formed by a frontal face adapted when in the first position to lie substantially in said plane and a clearance face rearwardly thereof disposed at an acute angle to said frontal face, yielding means for urging said blade from the second position toward the first position, and means for adjustably moving the pivotal axis of said blade radially with respect to the aperture axis to accommodate insulated conductors having different insulation thicknesses.

2. A rotary wire stripper comprising a hollow rotatable head having an end wall having an insulated wire receiving coaxial cylindrical aperture therein, said aperture terminating at least in part on a transverse plane within the head, a cutting blade pivotally mounted within the head on an axis lying substantially on said plane and laterally displaced from the aperture axis, said blade having a cutting edge adapted to swing from a first position in said plane and projecting partially across said aperture, to a second position radially disposed from the axis by an amount equal to the radius aperture and displaced rearwardly from said plane, said edge being formed by a frontal face adapted when in the first position to lie substantially in said plane and a clearance face rearwardly thereof disposed at an acute angle to said frontal face, and yielding means for urging said blade from the second position toward the first position, and an axial abutment mounted within the head disposed in spaced relation to said plane and facing said aperture.

3. A rotary wire stripper comprising a hollow rotatable head having an end wall having an insulated wire receiving coaxial cylindrical aperture therein, said aperture terminating at least in part on a transverse plane within the head, a cutting blade pivotally mounted within the head on an axis lying substantially on said plane and laterally displaced from the aperture axis, said blade having a cutting edge adapted to swing from a first position in said plane and projecting partially across said aperture, to a second position radially disposed from the axis by an amount equal to the radius of the aperture and displaced rearwardly from said plane, said edge being formed by a frontal face adapted when in the first position to lie substantially in said plane and a clearance face rearwardly thereof disposed at an acute angle to said frontal face, yielding means for urging said blade from the second position toward the first position, means for adjustably moving the pivotal axis of said blade radially with respect to the aperture axis to accommodate conductors having different thicknesses of insulation, and an axial abutment mounted within the head disposed in spaced relation to said plane and facing said aperture to gauge the length of a conductor to be stripped when projected through the aperture.

4. A wire stripper comprising a rotary stripper face plate, a guide sleeve extending through the plate having a cylindrical opening to receive an end length of insulated wire, said sleeve on its inner end having a portion thereof removed on one side to provide a step, a laterally disposed cutting blade carried by the plate pivotally mounted on an axis laterally disposed from and lying essentially in the plane of the riser of said step of said sleeve, said blade having a cutting edge formed by a forward face, and a clearance face having an angle of 75° from the forward face, said cutting edge lying across the cylindrical opening along a line radially displaced from the axis by a distance at least as great as the radius of the conductor to be stripped.

5. A wire stripper comprising a drive shaft, a hollow head mounted at one end on the drive shaft end, and having a face plate in its opposite end, said face plate having an aperture therethrough coaxial with said shaft, a guide sleeve of a length greater than the thickness of said plate having a cylindrical aperture mounted in said face plate aperture, with the guide sleeve aperture coaxial with said shaft, the inner end of said guide sleeve being spaced from the drive shaft end, and having a transverse surface formed by a step on its inner end, a knife blade element pivoted within said head on an axis laterally spaced from said guide sleeve, and having a cutting edge extending parallel with the pivotal blade axis, said blade cutting edge being formed by a flat forward face adapted to engage said step formed transverse guide sleeve surface with said flat face lying in a plane substantially transverse to the axis of said shaft and a clearance face angularly disposed with respect to the flat face and extending rearwardly from the cutting edge, at an angle of 75° to the flat face.

6. A wire stripper comprising a drive shaft, a hollow head mounted at one end on the drive shaft end, and having a face plate in its opposite end, said face plate having an aperture therethrough coaxial with said shaft, a guide sleeve of a length greater than the thickness of said plate having a cylindrical aperture mounted in said face plate aperture, with the guide sleeve aperture coaxial with said shaft, the inner end of said guide sleeve being spaced from the drive shaft end, and having a transverse surface formed by a step on its inner end, a blade support plate mounted on the back inside surface of said face plate, having a slot therein embracing said guide sleeve, said slot extending laterally therefrom, a knife blade element pivoted within said slot on an axis laterally spaced from said guide sleeve, and having a cutting edge extending parallel with the pivotal blade axis, said blade cutting edge being formed by a flat forward face adapted to engage said step formed transverse guide sleeve surface with said flat face lying in a plane substantially transverse to the axis of said shaft and a clearance face angularly disposed with respect to the flat face extending and rearwardly from the cutting edge, at an angle not greater than 75° to the flat face, and spring means for urging said blade to the position with its forward face against the transverse guide sleeve surface.

7. A wire stripper comprising a drive shaft, a hollow head mounted at one end on the drive shaft end, and having a face plate in its opposite end, said face plate having an aperture therethrough coaxial with said shaft, a guide sleeve of a length greater than the thickness of said plate having a cylindrical aperture mounted in said face plate aperture, with the guide sleeve aperture coaxial with said shaft, the inner end of said guide sleeve being spaced from the drive shaft end, and having a transverse surface formed by a step on its inner end, a blade support plate mounted on the back inside surface of said face plate, having a slot therein embracing said guide sleeve, said slot extending laterally therefrom, a knife blade element pivoted within said slot on an axis laterally spaced from said guide sleeve, and having a cutting edge extending parallel with the pivotal edge axis, said blade cutting edge being formed by a flat forward face adapted to engage said step formed transverse guide sleeve surface with said flat face lying in a plane substantially transverse to the axis of said shaft and a clearance face angularly disposed with respect to the flat face and extending from the cutting edge, at an angle not greater than 75° to the flat face, means to move the blade support plate laterally to position the cutting edge radially inward of the guide sleeve aperture by an amount approaching the thickness of insulation on the insulated wire to be stripped, and spring means for urging said blade to the position with its forward face against the transverse guide sleeve surface.

8. A wire stripper comprising a drive shaft, a hollow head mounted at one end on the drive shaft end, and having a face plate in its opposite end, said face plate having an aperture therethrough coaxial with said shaft, a guide sleeve of a length greater than the thickness of said plate having a cylindrical aperture mounted in said face plate aperture, with the guide sleeve aperture coaxial with said shaft, the inner end of said guide sleeve being spaced from the drive shaft end, and having a transverse surface formed by a step on its inner end, a blade support plate mounted on the back inside surface of said face plate, having a slot therein embracing said guide sleeve, said slot extending laterally therefrom, a knife blade element pivoted within said slot on an axis laterally spaced from said guide sleeve, and having a cutting edge extending parallel with the pivotal blade axis, said blade cutting edge being formed by a flat forward face adapted to engage said step formed transverse guide sleeve surface with said flat face lying in a plane substantially transverse to the axis of said shaft and a clearance face angularly disposed with respect to the flat face and extending from the cutting edge at an angle not greater than 75° to the flat face, spring means for urging said blade to the position with its forward face against the transverse guide sleeve surface, and axial stop means mounted within said head adjacent the drive shaft end, said means having a transverse end face disposed in spaced relation from the guide sleeve transverse surface, to abut and engage the end of wire to be stripped and fix the length of insulation to be stripped therefrom.

9. A wire stripper comprising a drive shaft, a hollow head mounted at one end on the drive shaft end, and having a face plate in its opposite end, said face plate having an aperture therethrough coaxial with said shaft.

a guide sleeve of a length greater than the thickness of said plate having a cylindrical aperture mounted in said face plate aperture, with the guide sleeve aperture coaxial with said shaft, the inner end of said guide sleeve being spaced from the drive shaft end, and having a transverse surface on its inner end, a blade support plate mounted on the back inside surface of said face plate, having a slot therein embracing said guide sleeve, said slot extending laterally therefrom, a knife blade element pivoted within said slot on an axis laterally spaced from said guide sleeve, and having a cutting edge extending parallel with the pivotal blade axis, said blade cutting edge being formed by a flat forward face adapted to engage a portion of the transverse guide sleeve surface with said flat face lying in a plane substantially transverse to the axis of said shaft and a clearance face angularly disposed with respect to the flat face and extending rearwardly from the cutting edge, means to move the blade support plate laterally to position the cutting edge radially inward of the guide sleeve aperture by an amount approaching the thickness of insulation on the insulated wire to be stripped, spring means for urging said blade to the position with its forward face against the transverse guide sleeve surface, and axial stop means mounted within said head adjacent the drive shaft end, said means having a transverse end face disposed in spaced relation from the guide sleeve transverse surface, to abut and engage the end of wire to be stripped and fix the length of insulation to be stripped therefrom.

10. A wire stripper comprising a face plate, said face plate having an aperture therethrough, a guide sleeve of a length greater than the thickness of said plate having a cylindrical aperture mounted in said face plate aperture, the inner end of said guide sleeve having a transverse surface, a blade support plate mounted on the back surfact of said face plate, a knife blade element pivoted upon said support plate on an axis laterally spaced from said guide sleeve, and having a cutting edge extending parallel with the pivotal blade axis, lying across the guide sleeve aperture at its inner end transverse surface, and means to move tse blade support plate laterally to position the cutting edge radially inward of the guide sleeve aperture by an amount approaching the thickness of insulation on a wire to be stripped.

11. A wire stripper comprising a face plate having an aperture therethrough, a guide sleeve of a length greater than the thickness of said plate having a cylindrical aperture disposed in said face plate aperture, and having a transverse surface on its inner end, a pair of blade support plates mounted on opposite sides of the sleeve on the back inside surface of said face plate, a knife blade element pivoted on each of said support plates upon axes laterally spaced from said guide sleeve, and having cutting edges extending parallel with the pivotal blade axes, and lying across the guide sleeve aperture at its inner transverse surface, and means to move each of the blade support plates laterally to position the cutting edge of its respective knife blade radially inward of the guide sleeve aperture by an amount approaching the thickness of insulation on the insulated wire to be stripped, and spring means for urging each of said blades to a position with its forward face against the transverse guide sleeve surface.

12. In a wire stripper, rotatable face plate means having a cylindrical aperture therethrough of a diameter to receive the outside diameter of an insulated conductor end, said aperture being flared at the front face end, and being cut away on one side at the other end to form a step to receive a stripping jaw, and present a transverse step riser face to act as an abutment for a stripping jaw and to provide a semi-cylindrical trough to support a wire projecting through said step, a hinged stripping jaw pivoted laterally of said step essentially in the plane of said riser step, said jaw having a cutting edge extending parallel with the pivotal axis and adapted to abut said riser face, and means for laterally adjusting said jaw to locate said cutting edge a radial distance from the axis of said aperture approximately the radius of the conductor portion of the insulated conductor to be stripped, and means for urging said jaw toward said riser face.

13. A guide sleeve for a wire stripper having a cylindrical aperture extending therethrough, said aperture being flared at one end of the sleeve, and said sleeve having a portion thereof cut away at the other end to form a step providing a riser hinged blade abutment surface extending transverse to the axis of the sleeve adapted to abut the back planar face of a cutting edge projecting part way across the aperture, and providing a semi-cylindrical trough for supporting the insulated end of a conductor extending through the sleeve, said trough being axially longer than the radial length of said abutment surface and adapted to support an insulated conductor against the opposed radial thrust of the hinged cutting edge in its arcuate travel into the thickness of conductor insulation terminating in the plane of the riser.

14. In combination, a rotating head having an axial aperture to receive an insulated wire end for projection therethrough for stripping, a wire stripping blade having a cutting edge and a blade holding block for a rotary wire stripper mounted on said head for rotation in a plane transverse to the axis of the aperture, said block being adjustable radially in said plane in relation to the central axis of the aperture and wire to be stripped so as to accommodate different gages of wire with different insulation thicknesses, said blade being pivotally mounted at its outer end in the block on a pivot axis lying substantially in said plane so that its inner cutting edge may lie in said plane and is free to swing away from the aperture axis by an amount at least as great as the radius of said aperture and in an arc perpendicular to the pivot axis in the block and the plane of rotation about the wire.

References Cited in the file of this patent

UNITED STATES PATENTS

| | | |
|---|---|---|
| 1,661,180 | Johnson | Mar. 6, 1928 |
| 2,239,755 | Montgomery | Apr. 29, 1941 |
| 2,530,219 | Bartusek | Nov. 14, 1950 |
| 2,563,911 | Beck | Aug. 14, 1951 |
| 2,671,363 | Wells | Mar. 9, 1954 |
| 2,915,928 | Felts et al. | Dec. 8, 1959 |

FOREIGN PATENTS

| | | |
|---|---|---|
| 123,507 | Australia | Feb. 5, 1947 |
| 554,637 | Great Britain | July 13, 1943 |